(12) United States Patent
Crick et al.

(10) Patent No.: US 7,389,386 B2
(45) Date of Patent: Jun. 17, 2008

(54) RECOMMENDATIONS FOR INTELLIGENT DATA CACHING

(75) Inventors: Darl Andrew Crick, Keswick (CA); Cyrus Tishan E. Mills, Scarborough (CA); Konstantinos Kontogiannis, Kitchener (CA); Man Fai Tang, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 11/088,377

(22) Filed: Mar. 24, 2005

(65) Prior Publication Data

US 2005/0240732 A1    Oct. 27, 2005

(30) Foreign Application Priority Data

Apr. 21, 2004    (CA) .................................... 2465155

(51) Int. Cl.
*G06F 12/00* (2006.01)
(52) U.S. Cl. ...................................................... 711/137
(58) Field of Classification Search ................. 711/133, 711/137, 138
See application file for complete search history.

(56) References Cited

U.S. PATENT DOCUMENTS

| | | | |
|---|---|---|---|
| 5,338,117 A | | 8/1994 | Kucksdorf et al. |
| 5,367,473 A * | | 11/1994 | Chu et al. .................... 702/186 |
| 6,351,767 B1 | | 2/2002 | Batchelder et al. |
| 6,408,360 B1 * | | 6/2002 | Chamberlain et al. ........ 711/124 |
| 6,598,121 B2 | | 7/2003 | Challenger et al. |
| 6,606,525 B1 | | 8/2003 | Muthuswamy et al. |
| 6,622,168 B1 * | | 9/2003 | Datta .......................... 709/219 |
| 6,631,451 B2 * | | 10/2003 | Glance et al. ............... 711/158 |
| 6,640,207 B2 | | 10/2003 | Witschel |
| 2002/0078300 A1 | | 6/2002 | Dharap |
| 2002/0099807 A1 | | 7/2002 | Doyle |
| 2002/0111992 A1 | | 8/2002 | Copeland et al. |
| 2002/0112032 A1 | | 8/2002 | Martin et al. |
| 2002/0112125 A1 | | 8/2002 | Copeland et al. |
| 2002/0116448 A1 | | 8/2002 | Copeland et al. |
| 2002/0116474 A1 | | 8/2002 | Copeland et al. |
| 2002/0116582 A1 | | 8/2002 | Copeland et al. |
| 2002/0116583 A1 | | 8/2002 | Copeland et al. |
| 2002/0133516 A1 | | 9/2002 | Davis et al. |
| 2002/0147997 A1 | | 10/2002 | Turner |
| 2002/0152244 A1 | | 10/2002 | Dean et al. |
| 2003/0187935 A1 | | 10/2003 | Agarwalla et al. |
| 2003/0188009 A1 | | 10/2003 | Agarwalla et al. |
| 2003/0188016 A1 | | 10/2003 | Agarwalla et al. |
| 2003/0188021 A1 | | 10/2003 | Challenger et al. |
| 2003/0191800 A1 | | 10/2003 | Challenger et al. |
| 2003/0191812 A1 | | 10/2003 | Challenger et al. |

* cited by examiner

*Primary Examiner*—Hiep T. Nguyen
(74) *Attorney, Agent, or Firm*—Joseph E. Bracken

(57) ABSTRACT

According to the present invention, there is provided a computer system, method and apparatus for making intelligent recommendations for dynamic content caching. In one embodiment of the present invention there is provided a computer implemented method for generating intelligent caching recommendations related to dynamic web content for use on a caching system. The method comprising extracting data associated with the dynamic content of interest in accordance with a predetermined data model. Next analyzing the extracted data in accordance with a plurality of certainty factors and a rule based expert system. Completing the analysis and generating a set of caching recommendations from the analyzed data suitable for use by the caching system. Implementing the recommendations in the caching system are repeated iteratively, as in a loop, automatically generating intelligent caching recommendations related to the dynamic web content for use on the caching system.

7 Claims, 5 Drawing Sheets

RECOMMENDATIONS FOR INTELLIGENT DATA CACHING

FIELD OF THE INVENTION

The present invention relates generally to data caching of web content on a computer system on a network and, more specifically, for making automated recommendations toward intelligent data caching of dynamic web page content.

BACKGROUND OF THE INVENTION

The Internet and the World Wide Web (WWW) provide intra-enterprise connectivity, inter-enterprise connectivity and application hosting on a larger scale than ever before. By exploiting the broadly available and deployed standards of the Internet and the WWW, system users and designers can leverage a single architecture to build client/server applications for internal use that can reach outside to customers, business partners and suppliers.

Each web site normally further provides a plurality of web pages to be served to the local computer systems upon request. Each local computer system may access the remote web sites with web browser software.

The WWW is a collection of servers on an IP (Internet Protocol) network, such as the Internet, an Intranet or an Extranet, that utilize the Hypertext Transfer Protocol (HTTP). Hereinafter, "Internet" will be used to refer to any IP network. HTTP is a known application protocol that provides users with access to files, which can be in different formats, such as text, graphics, images, sound, and video, using a standard page description language known as Hypertext Markup Language (HTML). Among a number of basic document formatting functions, HTML allows software developers to specify graphical pointers on displayed web pages, commonly referred to as "hyperlinks," that point to other web pages resident on remote servers. Hyperlinks commonly are displayed as highlighted text or other graphical image on the web page. Selection of a hyperlink with a pointing device, such as a computer mouse, causes the local computer to download the HTML associated with the web page from a remote server. The browser then renders the HTML into the displayed web page.

Web pages accessed over the Internet, whether by a hyperlink, opening directly via an "open" button in the browser, or some other means, are commonly downloaded into the volatile cache of a local computer system. In a computer system, for example, the volatile cache is a high-speed buffer that temporarily stores web pages from accessed remote web sites. The volatile cache thus enables a user to quickly review web pages that were already downloaded, thereby eliminating the need to repeat the relatively slow process of traversing the Internet to access previously viewed web pages. This is called local caching.

On the server side, the first web servers were merely HTTP servers that resolved universal resource locators (URLs) by extracting literally from the URL the path to a file that contained the needed page, and transmitting the page back to the browser. Such a server was very simple; it could only be used to access static pages.

A "static" page is a page which, each time it is requested and served to a requester, has the same byte content. That is, it does not depend upon which requester is requesting the page, when the requester is requesting the page, etc.; the byte content of that page remains the same. By contrast, a "dynamic page" is a page which has byte content that may very well change depending upon the particular requestor, when the page is being requested, etc. This will be discussed further below. It is important that web pages be served as quickly as possible, both to reduce the response time to a single user, and to increase the number of users that can be served concurrently. To improve the response time, the Web server uses caches. Web server caches are used to store web page responses in a readily accessible memory location so that when the web page is requested by a user, a previously cached web page response can be retrieved from cache and served quickly to the user.

Caching web page responses by the web server works quite well for web page responses having static content, i.e., content that doesn't change frequently. An example of a static web page is one, at a company's web site, comprising a compilation of text and graphics objects describing that company's history.

In fact, classic web servers cache static pages quite effectively. Specifically, classic web servers serve web page responses, some of which are static, namely, responses comprising HTML from the file system. Each of the static responses has a last modified date associated with it that is maintained by the file system. The contents of the response and its associated last modified date are simply stored in the cache for possible future use by the web server. When a subsequent request is received by the server for that page, the server requests the latest modification date for that page from the file system and compares the latest modification date with the last modified date associated with the candidate cached response. If the latest modification date is the same as the last modified date associated with the candidate cached response, the candidate cached response is considered to be "fresh" and is served to the request (i.e., to the requesting user). If the latest modification date is later than the last modified date associated with the candidate cached response, the candidate cached response is considered "stale" and a "fresh" response is retrieved and built by the web server for serving to the requesting user. The fresh response, along with its associated last modified date, is cached to replace the stale response. This caching scheme saves the time and server processor cycles that otherwise would have been spent to build requested pages which otherwise could have been cached using this classic caching scheme.

However, newer web servers provide not only static web pages but also dynamic web pages, i.e., a page having byte content that may very well change depending upon the particular requester, when the page is being requested, etc. Examples of dynamic web pages are pages containing content from a number of different sources or pages having computed content. For example, a page may contain macros that compute content for the page, i.e., the page has "computable content". These macros may change the page content each time the page is accessed. This makes it difficult to cache that page using the classic caching method described above. Macros or formulas are expressions that perform a function, such as determining field values, defining which documents appear in a view, or calculating values for a column.

Alternatively, the page may contain information from a number of different sources, and that information may or may not have associated last modified dates making it difficult, if not impossible, to cache using the classic caching method. For example, the page may comprise a composite of a number of "parts" including: other documents, designs from databases, content from databases, the present user's identity, the current time, the current environment, etc. Some of these parts are actual entities in the system, e.g., documents, databases, etc. Some parts though are "virtual" and are used to model the effects of the execution of macros or scripts, for example, the user's identity may be accessed via one of a number of macros for performing specialized. They can be used to format text strings, generate dates and times, format dates and times, evaluate conditional statements, calculate numeric values, calculate values in a list, convert text to numbers or numbers to text, or activate agents and actions. These various part types are computable parts and have correspondingly various types of attributes that can not be handled by the classic caching systems and methods.

Clearly, it is more difficult to use caching as a mechanism for improving user response time for pages with dynamic content. This problem for the server is twofold. First, after building a web page response, the server must determine whether the response that it is preparing to serve the requesting user is cacheable (i.e., determining its cacheability). Second, the server, upon receiving a request for a web page whose previous response has been cached, must determine whether the cached response is valid (i.e., determining its validity) and applicable (i.e., determining its applicability). For instance, web page responses containing macros that are time-dependent may not be cacheable at all. If a page includes a macro for providing the current time, then every access of the page is unique and the page cannot be cached in memory at all. Another example is where is a cached page is valid for serving to some users but not others. For instance, if the page includes a macro for the user's name, then the page can be cached for serving to that particular user, but not for serving to others. (HTML representing a document is specific to a user if macros are dependent on user name or user roles. Using this user data, some data may be made visible based on which user is requesting it.)

The term "Dynamic HTML" (DHTML) needs to be explained in the context of the embodiments of the present invention. "Dynamic" as used in DHTML is referring primarily to the effect that the code has on the web page appearance at the browser. For instance, the dynamic HTML may comprise scripts that run on the browser to change the appearance of the web page such as by displaying a button that, if pushed, displays additional text or graphics. The key distinction is that "dynamic" in the DHTML sense refers to the browser, not the server. From the server's point of view, a DHTML page may still be "static" in that the byte content may be the same each time the page is requested, so for the purposes of this invention, a DHTML page may be "static" or "dynamic" in the sense of the invention. The content is not dependent on any thing, e.g., the properties of the request, such as the identity of the particular user, the time of day that the request is made, etc. "Dynamic" content, as used in the embodiments of the present invention, refers to content that has such dependencies. Thus, "dynamic" in the DHTML sense is not related to "dynamic" in the sense of the embodiments of the present invention.

The problems may be further expressed as that of not knowing which dynamic content such as that found in JSP (Java server page) and ASP (active server page) technology need to be cached and then how to cache effectively. Further when implementing a manual cache configuration incorrect assumptions may cause system performance degradation. This problem arises when developers construct dynamic pages but do not cache them appropriately; which may then lead to poor system performance. Additional decisions based on the various dynamic properties of the page are required regarding whether to not cache a particular dynamic page at all or to cache it as a page fragment or a composite page (including sub-fragments). The drawback of these solutions is the need for significant knowledge of the dynamic content design and the system's dynamic content caching infrastructure.

As can be readily seen, using caching as a means for increasing server performance for responses which have dynamic content has a number of complications and difficulties which have not been overcome by prior systems. As such, HTML representing responses having dynamic content has not been cached in the past. Accordingly, an embodiment to cache content that can include dynamic content without suffering from the drawbacks discussed above is needed. An additional solution is required to make the caching process simpler such that developers can easily determine which dynamic content needs to be cached and how the content should be cached.

SUMMARY OF THE INVENTION

According to the present invention, there is provided a computer system, method and apparatus for making intelligent recommendations for dynamic content caching. In an embodiment of the present invention there is a focus on four main components. Included is a Scanner component that takes a list of dynamic pages as input and based on a dynamic page model (JSP, ASP, etc.) and XML definition file outputs the dynamic page content as entities-relationships data described in an XML file. This data is then fed into an Analyser component to be analyzed using the certainty factor model and rule based expert system implementation with user-defined object weighting schemes based on an Object Dependency Graph (ODG) model. The Analyzer then generates caching recommendations in an analysis report with Certainty Factors for each hypothesis, such as cached as a page fragment, cached as a composite page or not cached at all. The Analyser's output is in the form of an enhanced ODG with additional attributes described by an XML file. This enhanced ODG is then used by a Generator component to generate a cache policy for the computer system based on the computer system's cache policy model. The enhanced ODG may optionally be passed to a Visualizer component providing a graphical view of the cached objects and their dependencies. There is also a cache advisor report which may be viewed through the visualizer component.

Embodiments of the present invention may be used to minimize requirements for significant knowledge of page design and cache infrastructure of a system. It may also be used in place of using intuition to determine what needs to be cached, as the certainty factor and rule based expert system provides intelligent recommendations based on supporting evidence to optimize caching opportunities. Further by design all components are logically separated affording greater flexibility to plug in each component, such as the use of a different Scanner, Analyzer, Generator, or Visualizer component. Use of a tool such as that which may be an implementation of an embodiment of the present invention may also provide for automatic generation of the cache policy. Further instead of reading text or code, all object dependencies may be visualized in a user-friendly graphical user interface.

In one embodiment of the present invention there is provided a computer implemented method for generating intelligent caching recommendations related to dynamic web content for use on a caching system, comprising: extracting data associated with the dynamic content of interest in accordance with a predetermined data model; analyzing the extracted data in accordance with plurality of certainty factors and a rules based expert system; and generating a set of caching recommendations from the analyzed data suitable for use by the caching system.

In another embodiment of the present invention there is provided a computer system for generating intelligent caching recommendations related to dynamic web content for use on a caching system, comprising: a means for extracting data associated with the dynamic content of interest in accordance with a predetermined data model; a means for analyzing the extracted data in accordance with plurality of certainty factors and a rules based expert system; and a means for generating a set of caching recommendations from the analyzed data suitable for use by the caching system.

In yet another embodiment of the present invention there is provided an article of manufacture for directing a data processing system generate intelligent caching recommendations related to dynamic web content for use on a caching system, the article of manufacture comprising: a computer usable medium embodying one or more instructions executable by the data processing system, the one or more instructions comprising: data processing system executable instructions for extracting data associated with the dynamic content of interest in accordance with a predetermined data model; data processing system executable instructions for analyzing the extracted data in accordance with plurality of certainty factors and a rules based expert system; and data processing system executable instructions for generating a set of caching recommendations from the analyzed data suitable for use by the caching system.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate embodiments of the present invention by example only.

Like reference numerals refer to corresponding components and steps throughout the drawings.

DETAILED DESCRIPTION

Figure 1:
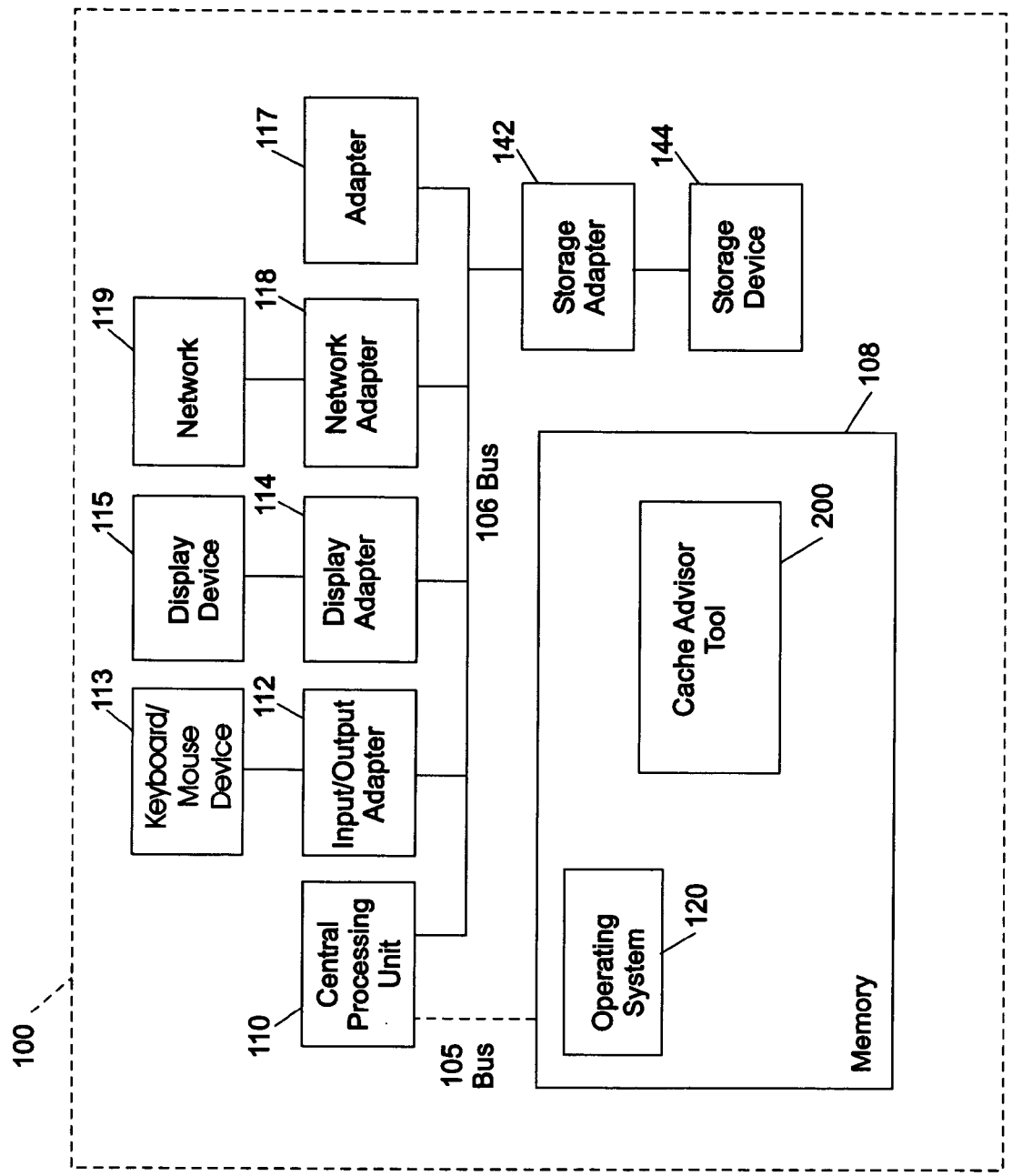
FIG. 1 is a block diagram of a typical computer system in which an embodiment of the present invention may be implemented.

FIG. 1 depicts, in a simplified block diagram, a computer system 100 suitable for implementing embodiments of the present invention. Computer system 100 has a central processing unit (CPU) 110, which is a programmable processor for executing programmed instructions, such as instructions contained in memory 108. Memory 108 can also include hard disk, tape or other storage media. While a single CPU is depicted in FIG. 1, it is understood that other forms of computer systems can be used to implement the invention, including multiple CPUs. It is also appreciated that the present invention can be implemented in a distributed computing environment having a plurality of computers communicating via a suitable network 119, such as the Internet.

CPU 110 is connected to memory 108 either through a dedicated system bus 105 and/or a general system bus 106. Memory 108 can be a random access semiconductor. Memory 108 is depicted conceptually as a single monolithic entity but it is well known that memory 108 can be arranged in a hierarchy of caches and other memory devices. FIG. 1 illustrates that operating system 120, may reside in memory 108. As well may components of an embodiment of the present invention such as that of cache advisor tool 200 of FIG. 2.

Operating system 120 provides functions such as device interfaces, memory management, multiple task management, and the like as known in the art. CPU 110 can be suitably programmed to read, load, and execute instructions of operating system 120 and those of cache advisor tool 200. Computer system 100 has the necessary subsystems and functional components to implement testing of files as will be discussed later. Other programs (not shown) include server software applications in which network adapter 118 interacts with the server software application to enable computer system 100 to function as a network server via network 119 as well as to provide data from remote instances supporting embodiments of cache advisor tool 200 and dynamic content 225.

General system bus 106 supports transfer of data, commands, and other information between various subsystems of computer system 100. While shown in simplified form as a single bus, bus 106 can be structured as multiple buses arranged in hierarchical form. Display adapter 114 supports video display device 115, which is a cathode-ray tube display or a display based upon other suitable display technology that may be used to depict data. Output device 295 of FIG. 2 may be one of a family of such devices as device 115. The Input/output adapter 112 supports devices suited for input and output, such as keyboard or mouse device 113, and a disk drive unit (not shown). Storage adapter 142 supports one or more data storage devices 144, which could include a magnetic hard disk drive or CD-ROM drive although other types of data storage devices can be used, including removable media for storing dynamic content 225 data as well as intermediate data such as files used to aid in processing of such data and for storing output in the form of reports and caching recommendations as in cachespec.xml 325.

Adapter 117 is used for operationally connecting many types of peripheral computing devices to computer system 100 via bus 106, such as printers, bus adapters, and other computers using one or more protocols including Token Ring, LAN connections, as known in the art. Network adapter 118 provides a physical interface to a suitable network 119, such as the Internet. Network adapter 118 includes a modem that can be connected to a telephone line for accessing network 119. Computer system 100 can be connected to another network server via a local area network using an appropriate network protocol and the network server can in turn be connected to the Internet. FIG. 1 is intended as an exemplary representation of computer system 100 by which embodiments of the present invention can be implemented. It is understood that in other computer systems, many variations in system configuration are possible in addition to those mentioned here.

Figure 2:
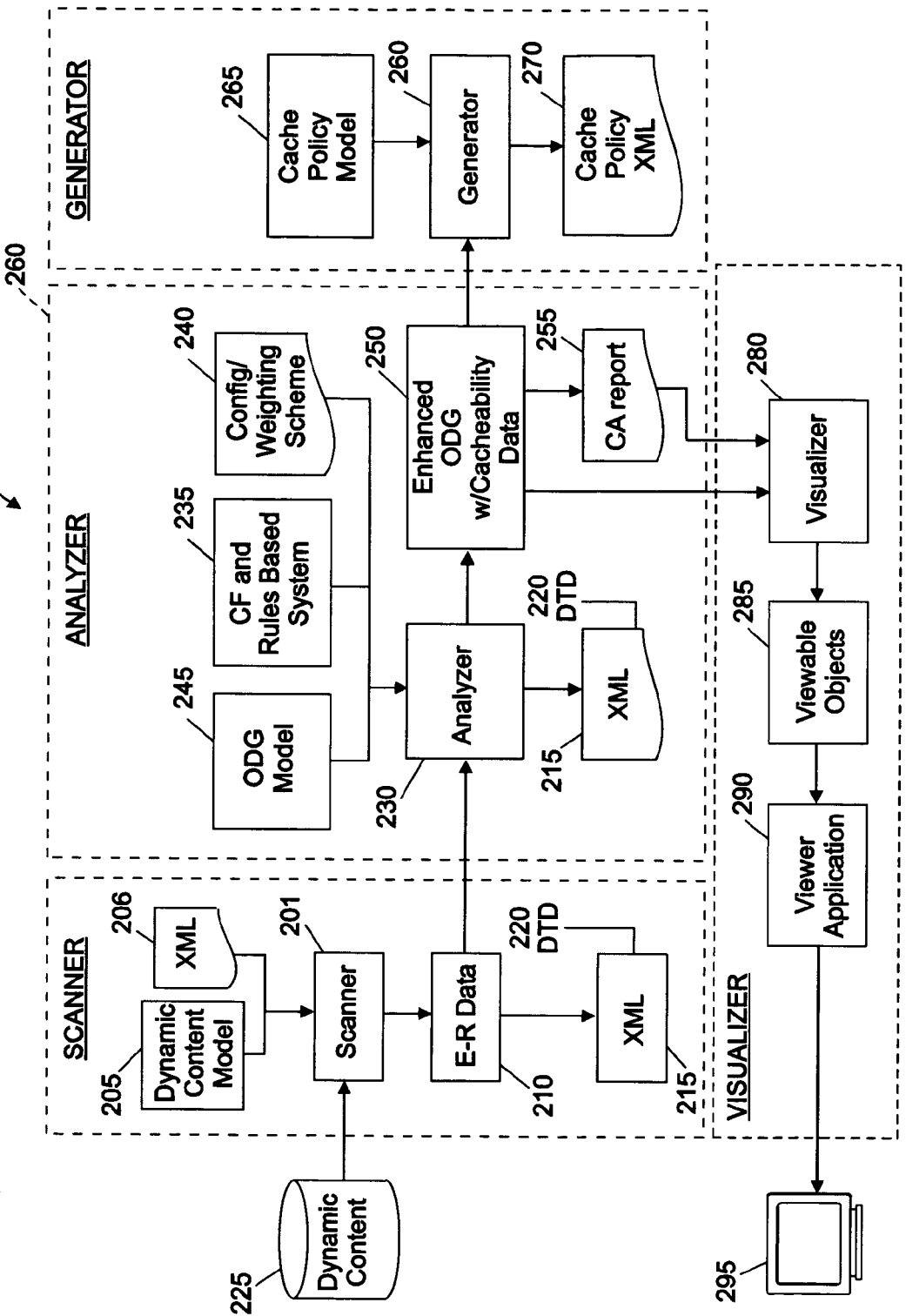
FIG. 2 is block diagram showing the components of an embodiment of the present invention of FIG. 1.

Logical system architecture to effectively automate the dynamic content recommendation process is established. The following FIG. 2 is a block diagram depicting the components and their relationships of an embodiment of the present invention which may be supported within a system configuration of FIG. 1. Scanner 201 extracts information from the dynamic content pages based on a selected dynamic page model, such as JSP or ASP. Extraction uses information regarding the dynamic page model from dynamic content model 205 in conjunction with data contained in XML file 206. The relationships found are then documented as entities-relationships 210 supported by another XML file 215 and related DTD 220. XML mapping 206 which represents dynamic content model 205 in an XML format is used by scanner 201 to parse different entity-relationships data 210.

Output of the translated data is in a XML format to be interpreted by analyser 230. Entities-relationships 210 is then translated through analyser 230 into an enhanced ODG (object dependency graph) model with cacheability data 250. Analyser 230 analyzes extracted dynamic page entities-relationships data 210 and extends ODG model 245 by attaching attributes to ODG nodes, obtained through analysis of the ODG 245 and the entire web application (with data from XML file 215 and related DTD 220). Analyser 230 also applies certainty factor model (probabilistic model) and expert system (heuristics) used for caching dynamic web content in conjunction with weighting scheme and XML based rules 240 for the expert system. The rules may be derived from various different cacheability indicators or evidence. Typical cacheability indicators are as follows:

High Variability (HV)—The number of invocations of a dynamic page

High External code (HEC)—The amount of code that accesses the database

High Internal Code (HIC)—The amount of code that performs logic

High Author-Time Reuse (HAR)—The number of times a dynamic page is dynamically included at author-time High Run-Time Reuse (HRR)—The number of times a dynamic page is requested at run-time High Run-Time Invalidation (HRI)—The number of times a dynamic page is invalidated at run-time For example, using the JavaServer Pages (JSP) dynamic page model:

HV is determined based on the number of request parameters (np) and the range of the parameters' values (rp).

HEC is determined based on the number of Java Bean's (nj), Taglibs (nt) and Plugins (nP).

HIC is determined based on the number of bytes of Java code (nc) in the JSP file HAR is determined based on the number of times a page is dynamically included in another page (ni)

HRR is determined based on the number of times an instance of a page is dynamically requested at run-time per hour (nr)

HRI is determined based on the frequency of invalidation of a page at run-time per hour (fi)

The above indicators or evidence may then be used to compute the certainty factors as found in certainty factors and rules based system 235 for a following hypothesis:

(Please see http://www.blutner.de/uncert/CertaintyFactor-Model.pdf for an introduction on the Certainty Factor Model)

NC=Not Cached
CwoF=Cached Without Fragments
CwF=Cached With Fragments
CF=Certainty Factor
MB=Measure of Belief
MD=Measure of Disbelief
h=hypothesis
e=evidence
$CF=(MB-MD)/1-\min(MB, MD)$
$MB[h|e]=1$ if $P(h)=1$, otherwise $MB[h|e]=(\max[P(h|e), P(h)]-P(h))/(1-P(h))$
$MD[h|e]=1$ if $P(h)=0$, otherwise $MD[h|e]=(\min[P(h|e), P(h)]-P(h))/-P(h)$ An initial set of CF's (rules), given certain evidence, need to be created in order to provide more accurate CF's given a combination involving any of these evidence. An example may be provided as: CF [CwoF|HAR & HRR]=0.9.

As well, probabilities given certain evidence need to be determined in the calculation of MB/MD as in the next example of $P(HV|np)=1$ if $(np>=MAXnp)$, otherwise $P(HV|np)=np/MAXnp$ Also, a prior probability (probability of an event without any evidence) of a dynamic page is required for each evidence. For example, Prior(HV) is the probability of any page having HV without any evidence.

Cacheability also takes into account a weighting scheme based on user input, allowing an expert developer to fine tune the algorithm. Prior probabilities for each evidence and values such as MAXnp in the examples above can be defined in a configuration file hence allowing the expert user knowledge to play a role in the cacheability calculation of different systems.

Analyser 230 produces output of the analyzed data in a XML format to be interpreted by Generator 260 for producing a cache policy 270 XML file. Output from analyser 230 may also be sent as enhanced ODG 250 with or without CA report 255 (cache advisor) to Visualizer 280 for a visual representation. Visualizer 280 creates viewable objects 285 for use with application view 290 to be seen on output device 295.

Generator 260 generates a cache policy based on the analysis report of enhanced ODG 250 and information combined with cache policy model 265. For example, the IBM product WebSphere Application Server Dynamic Cache uses a cache policy in the form of an XML file (cachespec.xml) and its cache policy model is the data type definition file (cachespec.dtd) for the cachespec.xml. Several of cache policy XML 270 may be generated based on a given confidence level.

Visualizer 280 provides a user with a graphical view of object dependencies determined through analysis using a colouring scheme to highlight relationships. For example when displaying objects and dependencies, objects that appear in blue may be JSPs, those in red may be Java beans, pink may be for tag libraries, and HTML objects may be in grey, while unknown object may appear in black. Similarly dependencies could be shown as green to indicate they are dynamic, while cyan could indicate static includes, pink for tag library links and grey for HTML anchors. Further any object having an arrow pointing to it by another object is a parent of that object while an object having a pointer to another object is the child of that object. In the usual manner clicking on an object or dependency will cause the properties of that object or dependency to be displayed. In this way the visualizer 280 provides the ability to view object information at the nodes and at the edges (if dependencies and attributes exist) of the enhanced ODG 250 and maps the analysis report to highlight the important objects with priorities.

Cache advisor report 255 is presented as a textual display having rows of information related to the relationships and resulting recommendations.

Figure 3:
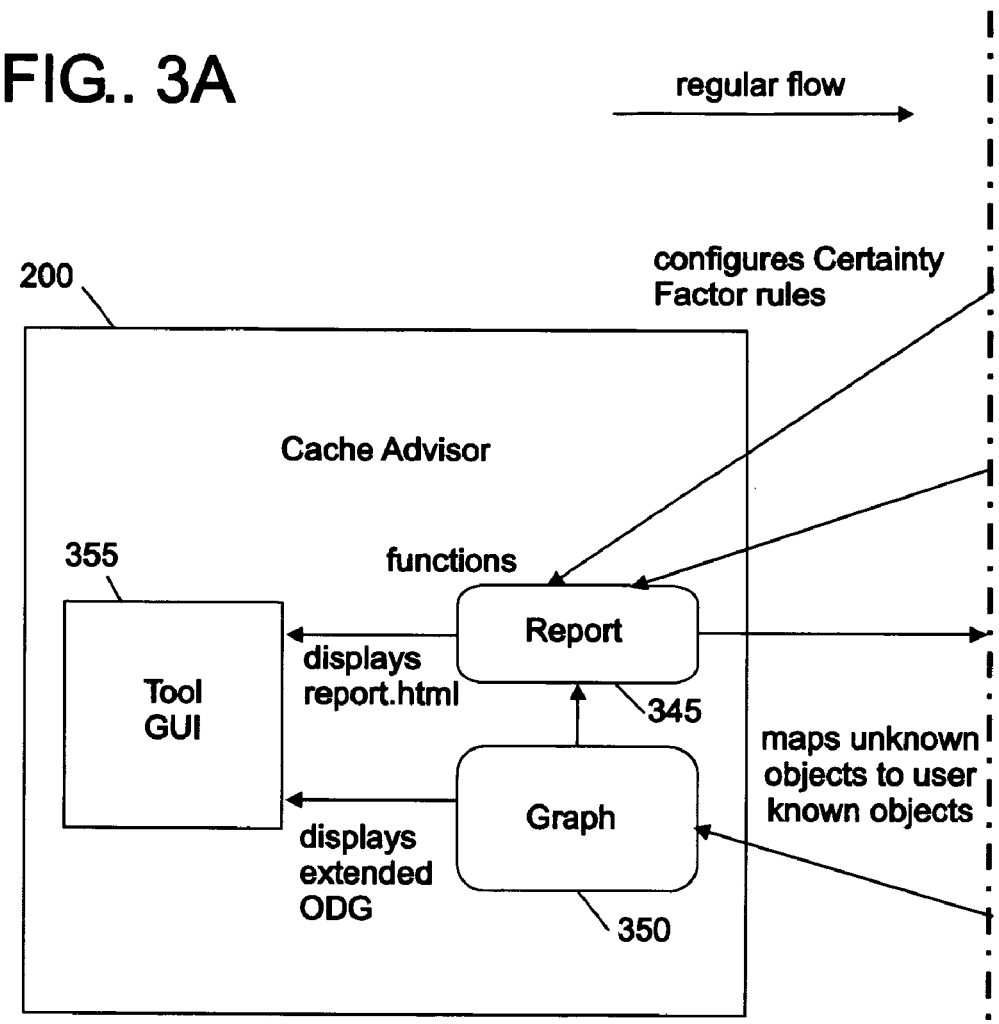
FIG. 3 is component flow diagram depicting data flow relationships among components of the embodiment of FIG. 2.
Figure 3:
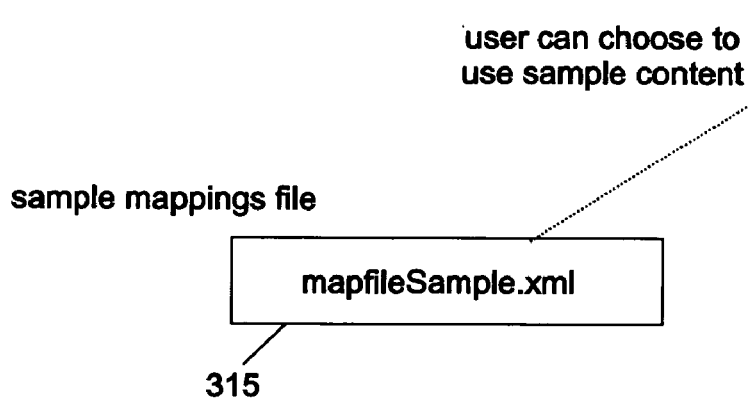
Figure 3:
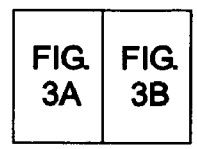
Figure 3B:
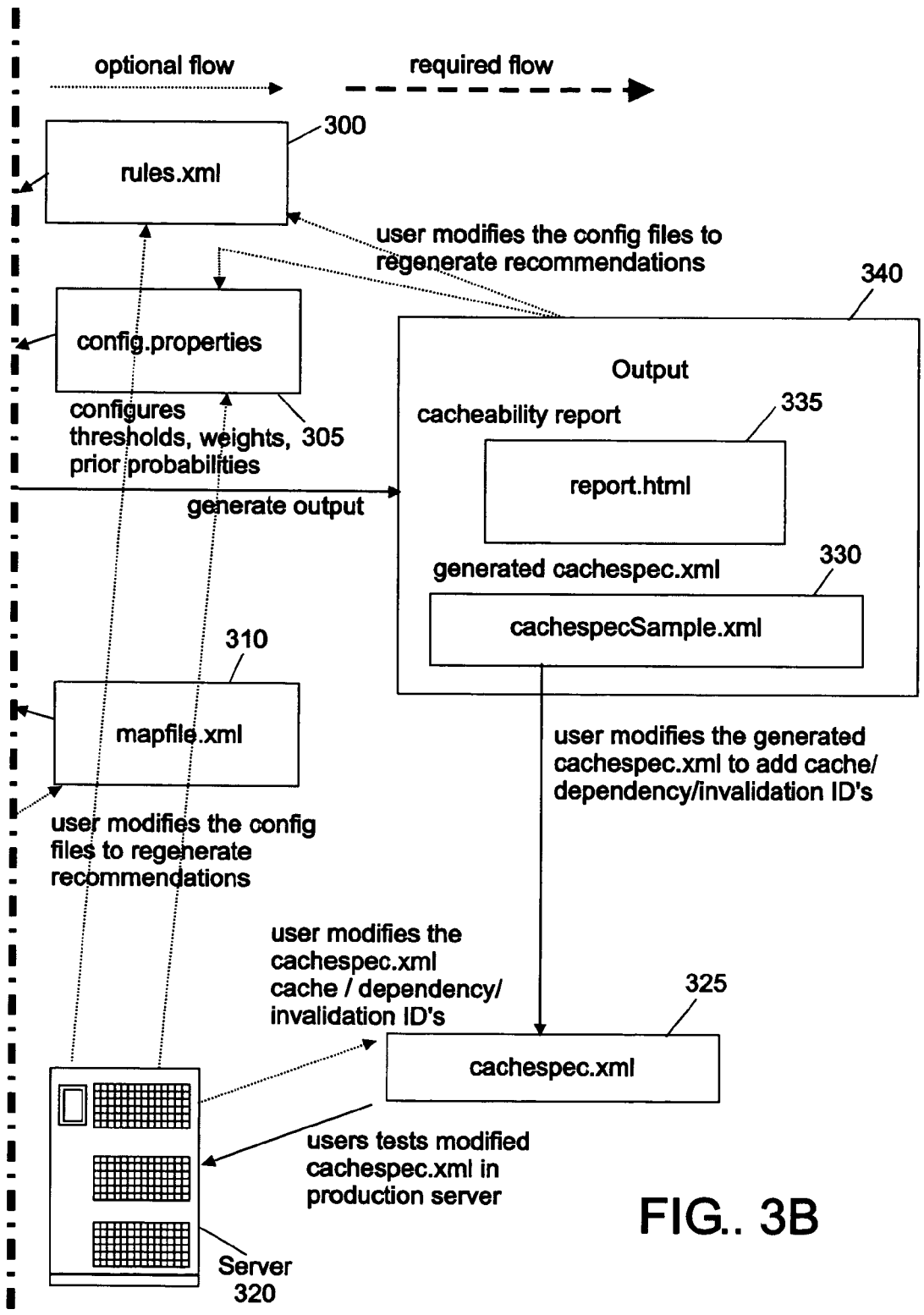

Referring now to FIG. 3 is an overview of the data flow of an embodiment of the present invention as may be used in a tool. In this embodiment of the present invention in the form of tool, there may be seen three configuration files: a mapfile.xml, a config.properties and a rules.xml. All three files are configurable by the user of the tool. It would be expected that one skilled in the art having knowledge of the system before would be able to modify the config.properties and rules.xml as these files may be provided with default values. In a similar manner a sample mapfile.xml called mapfileSample.xml may be provided to allow a user to use the content within mapfile-Sample.xml as is by renaming the file to mapfile.xml. In this manner the tool may be used rather quickly and allowing further configuration or customization to suit the intended use situation.

The file mapfile.xml is used to map unknown objects to user known objects, for example where some dynamically included page can become unknown, such as the case where the incfile below can be any value depending on the value of the string includeDir which doesn't get determined until runtime. To overcome such problems, a user defined mapping file to map unknown objects to user known objects is provided.

```
<%
    String incfile;
    incfile = includeDir + "CachedHeaderDisplay.jsp";
%>
<jsp:include page="<%=incfile%>" flush="true"/>
```

Sample syntax definition of a mapfile.xml may be as follows:
<maplist> is the root element that consists of a list of <mapping> elements
<mapping> is an element that defines a mapping of unknown objects to user known objects
"from" attribute defines the fully qualified path of the unknown object e.g. <%=incfile %> in any JSP's under directory FashionFlow will be defined as from="<path_to_FashionFlow>\FashionFlow\<%=incfile %>". Notice that the "<" is defined as < and ">" is defined as > in XML files
<destination> is an element that defines the destination mapping of the unknown objects
"to" attribute defines the fully qualified path of destination object e.g. if <%=incfile %> really refers to FashionFlow\include\styles\styles1\CachedHeader Display.jsp then one would define the destination as to="<path_to_FashionFlow\FashionFlow\include\styles\style1\CachedHeaderDisplay.jsp"
Following is a sample of the mapfile.xml file:

```
<?xml version="1.0" encoding="UTF-8"?>
<maplist>
    <mapping
from="C:\WSAD\workspace_CAS\CacheAdvisor\WC_Code\
FashionFlow\<%=incfile%>">
        <destination
to="C:\WSAD\workspace_CAS\CacheAdvisor\WC_Code\FashionFlow\
include\styles\style1\HeaderDisplay.jsp"/>
        <destination
to="C:\WSAD\workspace_CAS\CacheAdvisor\WC_Code\FashionFlow\
include\styles\style1\FooterDisplay.jsp"/>
        <destination
to="C:\WSAD\workspace_CAS\CacheAdvisor\WC_Code\FashionFlow\
include\styles\style1\SidebarDisplay.jsp"/>
    </mapping>
```

The config.properties file contains information needed to configure prior probabilities, weighting schemes, and threshold values used by the analyser.

Threshold values are values that determine if an evidence is completely true, e.g. in the cacheability algorithm rule $P(HV|np)=1$ if $(np>=MAXnp)$, otherwise $P(HV|np)=np/MAXnp$ where MAXnp is the threshold value for np, the probability of high variability given evidence of number of request parameters is equal to 1 if the number of request parameters is greater than or equal to the threshold value defined by MAXnp, otherwise the probability of high variability given evidence of number of request parameters is equal to the number of request parameters divided by the threshold value MAXnp.

Weight schemes define the weighting of each attribute contributing to the belief or disbelief of the evidence, e.g. users can define how the number of request parameters (np) and the range of the request parameters (rp) will contribute to the calculation of high variability (HV). These weights are expressed in the config.properties as percentages in the form of decimals (30% or 0.3 weight for np and 70% or 0.7 weight for rp), therefore the weight of np+the weight of rp=1.

Prior probabilities define the probabilities of an event without any evidence support. These prior probabilities are used in cases where there does not exist evidence support, e.g. missing the information of number and range of request parameters then the calculation of HV will use the prior probabilities.

A sample of the syntax definition of config.properties follows:
threshold.max.params (denoted earlier by MAXnp) is the threshold value for the number of request parameters
threshold.max.range is the threshold value for the range of request parameters
threshold.max.beans is the threshold value for the number of beans
threshold.max.tagLibs is the threshold value for the number of tag libraries
threshold.max.bytesCode is the threshold value for the number of bytes of the page
threshold.max.dynaInc is the threshold value for the number of dynamic includes of the page
threshold.max.statInc is the threshold value for the number of static includes of the page
threshold.max.runTimeReuse is the threshold value for the number of runtime reuses of the page (this value will not be used until runtime analysis is incorporated into the tool)
threshold.max.runTimeInvalid is the threshold value for the number of runtime invalidations of the page (this value will not be used until runtime analysis is incorporated into the tool)
weight.numParams is the weight of the number of request parameters
weight.totalRange is the weight of the range of request parameters
weight.numBeans is the weight of the number of beans
weight.numTagLibs is the weight of the number of tag libraries
weight.numBytesCode is the weight of the number of bytes of the page
weight.numDynaInc is the weight of the number of dynamic includes
weight.numStatInc is the weight of the number of static includes
weight.runTimeReuse is the weight of the runtime reuses (this value will not be used until runtime analysis is incorporated into the tool)
weight.runTimeInvalid is the weight of the runtime invalidations (this value will not be used until runtime analysis is incorporated into the tool)
prior.variability is the prior probability of high variability prior.extCode is the prior probability of high external code prior.intCode is the prior probability of high internal code prior.authTimeReuse is the prior probability of high author time reuse prior.runTimeReuse is the prior probability of high runtime reuse (this value will not be used until runtime analysis is incorporated into the tool)

prior.runTimeInvalid is the prior probability of high runtime invalidation (this value will not be used until runtime analysis is incorporated into the tool)

prior.ncChild is the prior probability of having a non-cached child prior.cwofChild is the prior probability of having a child that's cached without fragments The following is an example of a config.properties file containing settings for configuring prior probabilities, weighting schemes, and threshold values. The threshold values are values that determine if an evidence is completely true, e.g. in the cacheability algorithm rule P(HV|np)=1 if (np>=MAXnp), otherwise P(HV|np)=np/MAXnp where MAXnp is the threshold value for np, the probability of high variability given evidence of number of request parameters is equal to 1 if the number of request parameters is greater than or equal to the threshold value defined by MAXnp, otherwise the probability of high variability given evidence of number of request parameters is equal to the number of request parameters divided by the threshold value MAXnp.

Weight schemes define the weighting of each attribute contributing to the belief or disbelief of the evidence, e.g. users can define how the number of request parameters (np) and the range of the request parameters (rp) will contribute to the calculation of high variability (HV). These weights are expressed in this config.properties as percentages in the form of decimals (30% or 0.3 weight for np and 70% or 0.7 weight for rp), therefore the weight of np+the weight of rp=1.

Prior probabilities define the probabilities of an event without any evidence support. These prior probabilities are used in cases where there does not exist evidence support, e.g. missing the information of number and range of request parameters then the calculation of HV will use the prior probabilities.

Sample syntax definition of a config.properties file follows:

threshold.max.params (denoted earlier by MAXnp) is the threshold value for the number of request parameters threshold.max.range is the threshold value for the range of request parameters threshold.max.beans is the threshold value for the number of beans threshold.max.tagLibs is the threshold value for the number of tag libraries threshold.max.bytesCode is the threshold value for the number of bytes of the page threshold.max.dynaInc is the threshold value for the number of dynamic includes of the page threshold.max.statInc is the threshold value for the number of static includes of the page threshold.max.runTimeReuse is the threshold value for the number of runtime reuses of the page (this value will not be used until runtime analysis is incorporated into the tool)

threshold.max.runTimeInvalid is the threshold value for the number of runtime invalidations of the page (this value will not be used until runtime analysis is incorporated into the tool)

weight.numparams is the weight of the number of request parameters weight.totalRange is the weight of the range of request parameters weight.numBeans is the weight of the number of beans weight.numTagLibs is the weight of the number of tag libraries weight.numBytesCode is the weight of the number of bytes of the page weight.numDynaInc is the weight of the number of dynamic includes weight.numStatInc is the weight of the number of static includes weight.runTimeReuse is the weight of the runtime reuses (this value will not be used until runtime analysis is incorporated into the tool)

weight.runTimeInvalid is the weight of the runtime invalidations (this value will not be used until runtime analysis is incorporated into the tool)

prior.variability is the prior probability of high variability prior.extCode is the prior probability of high external code prior.intCode is the prior probability of high internal code prior.authTimeReuse is the prior probability of high author time reuse prior.runTimeReuse is the prior probability of high runtime reuse (this value will not be used until runtime analysis is incorporated into the tool)

prior.runTimeInvalid is the prior probability of high runtime invalidation (this value will not be used until runtime analysis is incorporated into the tool)

prior.ncChild is the prior probability of having a non-cached child prior.cwofChild is the prior probability of having a child that's cached without fragments Following is an example of a default config.properties file showing the settings with values:

```
//////////////////////////
// THRESHOLDS //
//////////////////////////
threshold.max.params = 5
threshold.max.range = 10000
threshold.max.beans = 2
threshold.max.tagLibs = 3
threshold.max.bytesCode = 10000
threshold.max.dynaInc = 4
threshold.max.statInc = 4
threshold.max.runTimeReuse = 600
threshold.max.runTimeInvalid = 60
//////////////////////////
// WEIGHTING SCHEMES //
//////////////////////////
// -- Variability
weight.numParams = 0.3
weight.totalRange = 0.7
// -- External Code
weight.numBeans = 0.95
weight.numTagLibs = 0.05
// -- Internal Code
weight.numBytesCode = 1
// -- Author-time Reuse
weight.numDynaInc = 0.5
weight.numStatInc = 0.5
// -- Run-time Reuse
weight.runTimeReuse = 1
// -- Run-time Invalidation
weight.runTimeInvalid = 1
//////////////////////////
// PRIOR PROBABILITIES //
//////////////////////////
prior.variability = 0.01
prior.extCode = 0.2
prior.intCode = 0.01
```

-continued

```
prior.authTimeReuse = 0.1
prior.runTimeReuse = 0.0
prior.runTimeInvalid = 0.0
prior.ncChild = 0.1
prior.cwofChild = 0.2
```

The rules.xml file contains specification of certainty factor rules. These certainty factor rules need to be defined in a rules.xml file for subsequent use by the cacheability algorithm. For example, the first rules within the rule list for CWF is CF [CwF |HV & HEC & HAR & HRR]=0.9.

Sample syntax definitions for a rules.xml type of file are as follows:

- <cacheadvisor> is the root element that contains a list of <rulelist> elements
- <rulelist> element contains a list of <rule> elements that define the Certainty Factors for certain rules
- "name" attribute is the name of the hypothesis, e.g. CWF— Caching with fragments, CWoF—Caching without fragments, NC—Not Cached
- <rule> element contains a proposition that defines the Certainty Factor rule
- "cf" attribute is the certainty factor for the rule
- <proposition> element contains a list of <proposition> elements that define the components in the rule
- "type" attribute is the operator of the proposition, the values can be conjunction (and &), disjunction (or |), atomic (without operator)
- "negate" attribute is the negation of the proposition, the values can be true or false
- "name" attribute is the name of the evidence, the values can be:
- variability—is determined by two page properties: number of request parameters and the range (possibilities of values) of the request parameters
- internalCode—is determined by the number of bytes (file size) of the dynamic page
- externalCode—is determined by the number of beans and tag libraries of the dynamic page
- authortimeReuse—is determined by the number of times the page is dynamically included
- runtimeReuse—is determined by the number of times the page is hit at runtime
- runtimeInvalidation—is determined by the number of invalidations of the page at runtime
- notCachedChildren—is determined by whether the page has a child that's not cached
- CWoFChildren—is determined by whether the page has a child that caches without fragments
- CWFChildren—is determined by whether the page has a child that caches with fragments
- childRequested—is determined by whether the page is sending request parameters to dynamically included child The following is an example of a portion of a default rules.xml file showing two rules:

```
<?xml version="1.0"encoding="UTF-8"?>
<cacheadvisor>
    <rulelist name="CWF">
        <rule cf="0.9">
            <proposition type="conjunction">
                <proposition type="atomic" name=
```

-continued

```
                "variability"/>
                <proposition type="atomic" name=
                "externalCode"/>
                <proposition type="atomic" name=
                "authortimeReuse"/>
                <proposition type="atomic" name=
                "runtimeReuse"/>
            </proposition>
        </rule>
        <rule cf="0.7">
            <proposition type="conjunction">
                <proposition type="atomic" name=
                "authortimeReuse"/>
                <proposition type="atomic" name=
                "notCachedChildren"
    negate="true"/>
                <proposition type="atomic" name=
                "CWoFChildren"negate="true"/>
            </proposition>
        </rule>
    </rulelist>
</cacheadvisor>
```

Having just described the more granular elements a sample usage flow will now be described. Cache advisor 200 is an implementation of an embodiment of the present invention in the form of a computer system tool containing specific functions for managing cache data as described in FIG. 2. Components tool GUI 355; report 345 and graph 350 correspond to elements as previously shown. Tool GUI 355 is used to provide the display mechanism for reports such as report.html 335 as generated by generator 260. Certainty factor rules contained within file rules.xml 300 are provided to analysis functions of cache advisor 300. These rules comprise the expert based rules system contained within the embodiment. The value ranges from disbelief to belief and is not to be confused with a probability. Config.properties 305 is also used by cache advisor 200 functions as it contains data regarding settings and values for thresholds, weights and prior probabilities. Mapfile.xml 310 provides the third piece of data to cache advisor 200 in the form of mapping entries. These mapping entries resolve unknown entries to some user known entry. The user can choose to use a sample set of data as may be found in file mapfilesample.xml 315 or modify the sample to provide more installation unique data. Optionally the user may also modify settings contained within rules.xml 300 and config.properties 305 as a means to generate different recommendations.

Report 345 and graph 350 components of cache advisor 200 may be viewed as part of visualizer 280 of cache advisor 200. The file objects just described may be viewed through report 345 and tool GUI 355 or other tool capable of displaying files having XML data. Cache advisor 200 generates output in the form of report.html 335 which is a cacheability report and cachespecsample.xml containing recommended cache data. The user would further modify cachespecsample.xml 330 by adding information regarding cache, data dependency and invalidation identifiers to create cache implementation file cachespec.xml 325. Cachespec.xml 325 is further tested and modified by the user throughout production cycles. Information from an implementation on server 320 further provides input to modifications of the configuration files (rules.xml 300, config.properties 305 and mapfile.xml 310) to regenerate recommendations as output in cachespec.xml 325.

Figure 4:
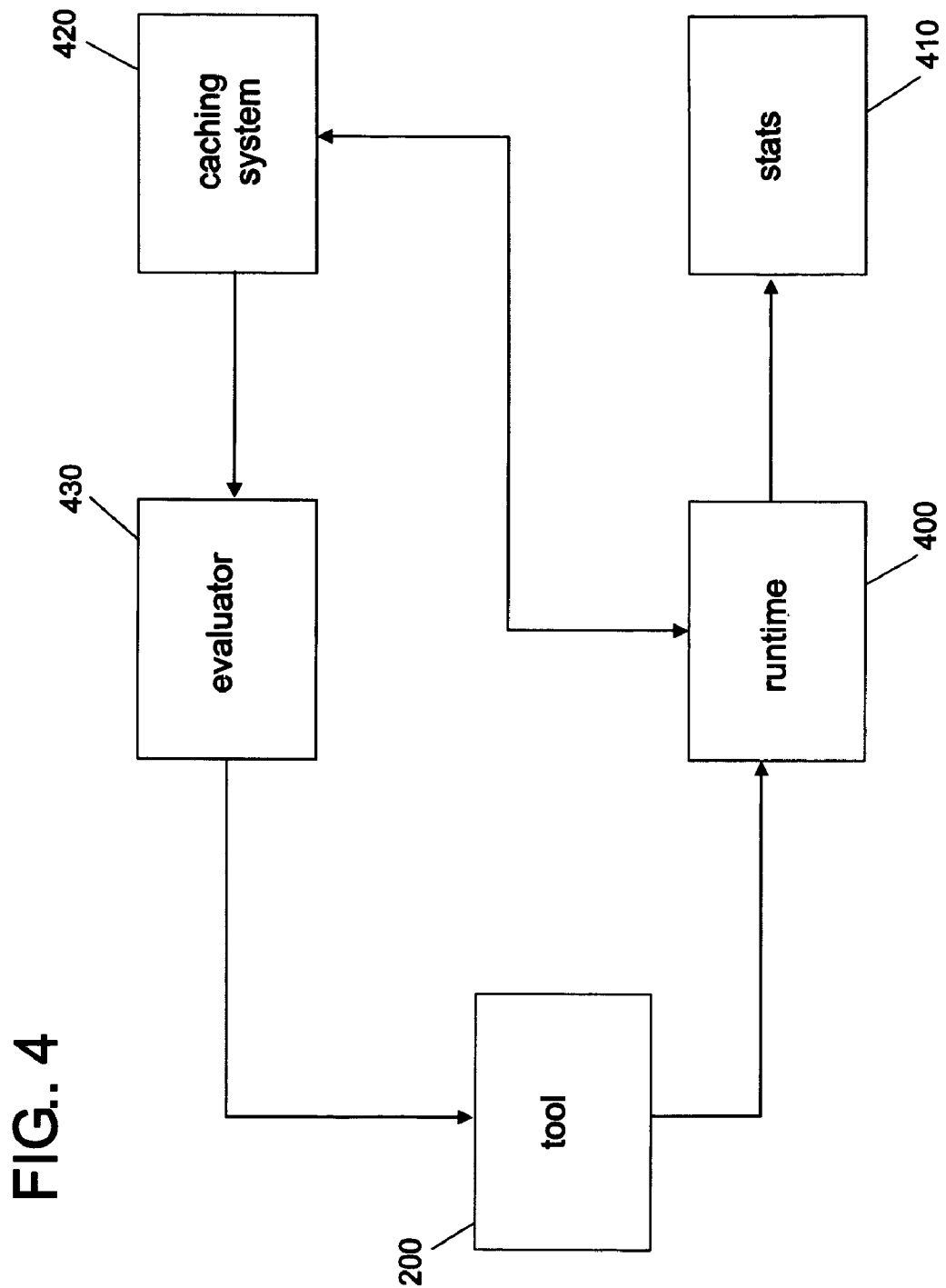
FIG. 4 is a block diagram depicting interaction among components of a system of FIG. 1 and the embodiment of FIG. 2.

Referring now o FIG. 4 is a block diagram showing the relationship between cache advisor tool 200 of FIG. 2 and computer system 100 of FIG. 1. Beginning with runtime 400 is the environment in which the applications of interest execute generating empirical data describing activity and events. This information is collected in various forms such as web logs by a statistics collector activity 410. Collector 410 may also collect other information regarding application usage as defined by collection routines and capabilities of the generating application and support infrastructure. Information obtained through collector 410 is passed to evaluator 430. Evaluator 430 combines the statistics describing application activity with data obtained from caching system 420. Caching system 420 may be at least one of a hardware, software or combination thereof. A particular implementation is not important as the ability to provide data on the functional performance of the caching system itself. Evaluator 430 then determines data regarding cache hit ratio, page invalidation and reusability of pages and other cache related information which may be of value in assessing and improving performance of the dynamic content being served. This evaluated information is then fed into the analyser of cache advisor tool 200 as described in FIG. 2. Analysis of the received data is performed in cache advisor tool 200 and recommendations are provided and implemented in server 320 of FIG. 3 operating in runtime 400. All of this activity may occur within a single system such as server 320 or it may be dispersed across a number of physical systems of which FIG. 1 shows but one example. The recommendation system as described may operate as an automatic iterative feedback loop generating collecting assessing and recommending change to tune or improve the performance of serving dynamic content. The user in the form of a system administrator also has the opportunity to inject values into the process so as to manually override recommendations provided by the cache advisor tool 200.

Of course, the above described embodiments are intended to be illustrative only and in no way limiting. The described embodiments of carrying out the present invention are susceptible to many modifications of form, arrangement of parts, details and order of operation. The invention, rather, is intended to encompass all such modification within its scope, as defined by the claims.

The embodiments of the invention in which an exclusive property or privilege is claimed are defined as follows:

1. A computer implemented method for generating intelligent caching recommendations related to dynamic web content for use on a caching system, comprising:

extracting data associated with the dynamic content of interest in accordance with a predetermined data model;

analyzing the extracted data in accordance with plurality of certainty factors and a rules based expert system; and generating a set of caching recommendations from the analyzed data suitable for use by the caching system.

2. The computer implemented method of claim 1 wherein the step of extracting the data comprises:

a dynamic content model in combination with dynamic content descriptors; and produces a plurality of entity-relationship data.

3. The computer implemented method of claim 1 wherein the step of analyzing the extracted data comprises:

obtaining an object dependency model;

obtaining a weighting scheme;

creating an enhanced object dependency graph model combined with cacheability data; and, creating a cache advisor report.

4. The computer implemented method of claim 1 wherein, the step of generating a set of caching recommendations comprises:

obtaining a cache policy model for use with a generator; and generating a cache policy.

5. The computer implemented method of claim 3, wherein the enhanced object dependency graph model combined with cacheability data and the cache advisor report may be optionally viewed through a visualizer.

6. The computer implemented method of claim 5, wherein optional viewing through the visualizer provides color-keyed output of the enhanced object dependency graph model combined with cacheability data designating the inherent relationships and properties of the enhanced object dependency model combined with cacheability data.

7. The computer implemented method of claim 1, wherein the steps of extracting data associated with the dynamic content of interest in accordance with a predetermined data model, the analyzing the extracted data in accordance with plurality of certainty factors and a rules based expert system and the generating a set of caching recommendations from the analyzed data suitable for the caching system and implementing the recommendations in the caching system are repeated iteratively, as in a loop, automatically generating intelligent caching recommendations related to the dynamic web content for use on the caching system.

* * * * *